Jan. 16, 1940. I. M. LADDON ET AL 2,187,040
RETRACTABLE ALIGHTING GEAR
Filed April 16, 1937 2 Sheets-Sheet 1
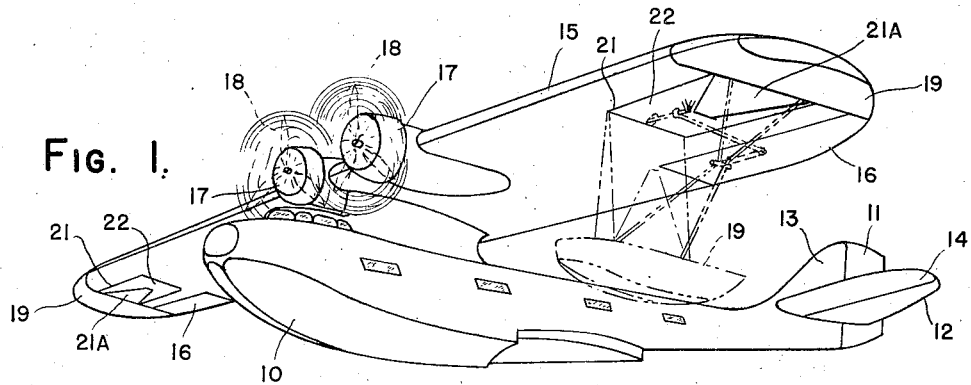
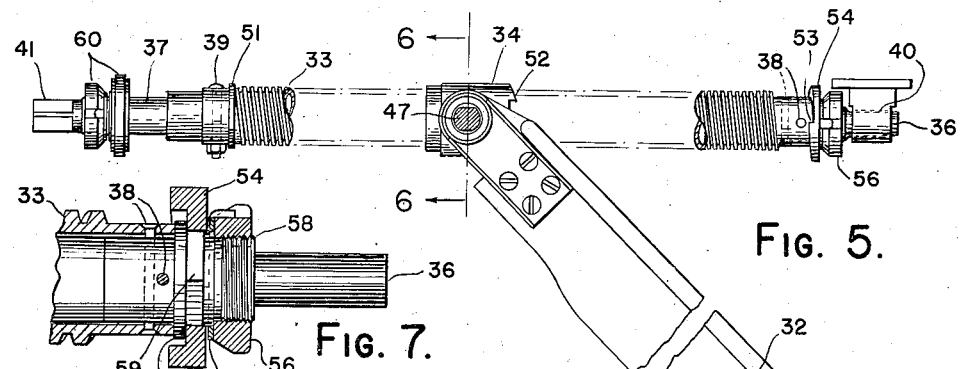
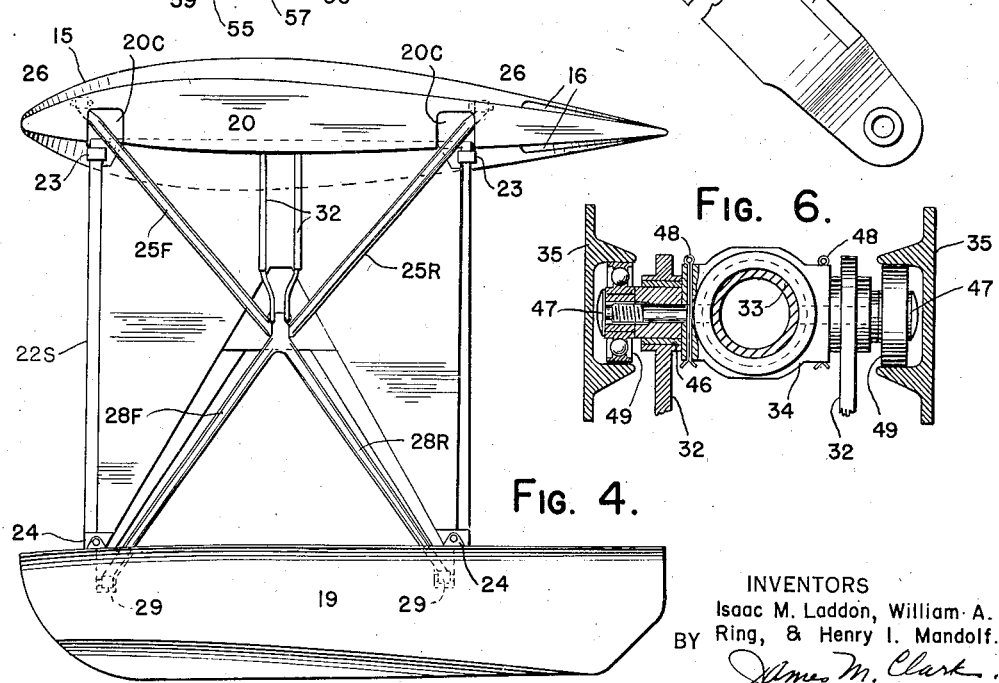
INVENTORS
Isaac M. Laddon, William A. Ring, & Henry I. Mandolf.
BY James M. Clark
ATTORNEY Jan. 16, 1940.　　I. M. LADDON ET AL　　2,187,040
RETRACTABLE ALIGHTING GEAR
Filed April 16, 1937　　2 Sheets-Sheet 2

INVENTORS
Isaac M. Laddon, William A.
BY Ring, & Henry I. Mandolf.
James M. Clark
ATTORNEY Patented Jan. 16, 1940

2,187,040

UNITED STATES PATENT OFFICE 2,187,040

RETRACTABLE ALIGHTING GEAR

Isaac M. Laddon, William A. Ring, and Henry I. Mandolf, San Diego, Calif., assignors to Consolidated Aircraft Corporation, a corporation of Delaware Application April 16, 1937, Serial No. 137,214

8 Claims. (Cl. 244—102)

The present invention relates broadly to alighting devices for aircraft and more particularly to mechanism adapted for the retraction of such devices to positions within or against the wings of aircraft for minimizing resistance during flight.

It has previously been proposed to retract the ground or water engaging members of aircraft to positions wherein the members occupied spaces either within the wing contour or in alignment with the wing at its outer extremity. These prior constructions have not been adapted for use with the relatively heavier stabilizing floats or pontoons positioned at the wing tips of large flying boats, particularly since good design calls for complete housing of the retracting mechanism within the outline of the wing at that part of its span which is usually its portion of minimum thickness.

It is accordingly an object of this invention to provide a wing float and retracting mechanism adapted to retract the float to a position against the wing end to be itself entirely housed within the wing profile. Another object is to provide a retracting mechanism comprising a system of struts and levers which have a relatively high mechanical advantage in lifting the float through the last stage of its retracting movement. A further object is to provide such a mechanism which requires a relatively small holding force to maintain the float in its retracted position.

Another object of the invention is to provide a breaking strut mechanism having an offset portion positioned with respect to the wing chord such that it takes full advantage of the wing thickness as the breaking strut folds within itself during retraction. A further object is to provide a wing tip float which extends both above and below the wing surfaces to minimize the tip losses thereover, being additionally effective in the extended position of the float. Another object is to provide a combined screw rod and lever operating mechanism which will hold the float for loading at intermediate points in its extension and which locks itself in the fully extended position by an arrangement which prevents damage to the threads of the screw rod. A still further object is to provide a retractable float which is bonded electrically to ground the aircraft at remote points in order to minimize fire hazards and facilitate radio operation.

Other objects and advantages will become apparent during the course of the following description when considered with the accompanying drawings forming a part of this specification and in which like numerals are employed to designate corresponding parts in all the views.

Fig. 1 shows a flying boat in flight with the wing tip floats retracted and a phantom view of the port float as it would appear in its extended position;

Fig. 4 is a side elevation of the wing end showing the extended float;

Fig. 5 is a side elevation of the wing end showing the screw rod retracting mechanism and the associated link member;

Fig. 6 is a cross-section taken along the lines 6—6 in Fig. 5, showing the pivotal connection of the link member to the screw shaft and the associated guide rails;

Fig. 7 is a detail cross-section of the out-board end of the screw shaft shown in Fig. 5;

Figure 2:
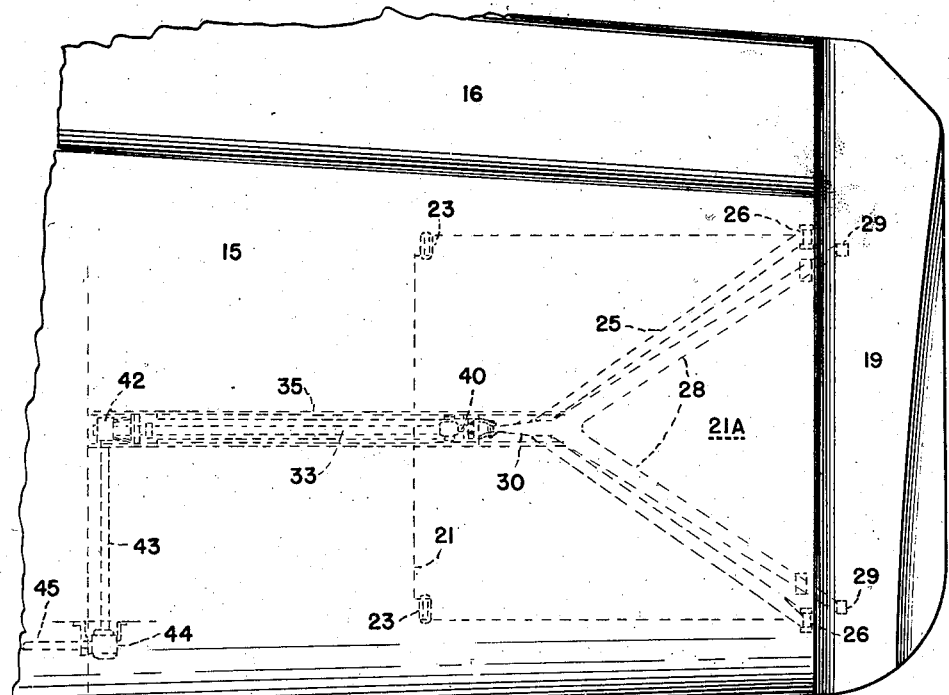
Fig. 2 shows a plan of the tip portion of the wing with the float in the retracted position.

Referring to Fig. 1, 10 shows the cabin portion of the hull of a flying boat provided with a conventional empennage consisting of rudder 11, elevators 12 and the associated vertical and horizontal stabilizers 13 and 14, respectively. A single wing 15 provided with ailerons 16 has positioned at its leading edge engine nacelles 17 and tractor propellers 18. Obviously the hull 10 may be provided with sponsons, there may be more than one wing, and any number and disposition of engines and propellers may be provided, since the present invention is equally applicable to all of these types of aircraft and many others.

Figures 3, 8:
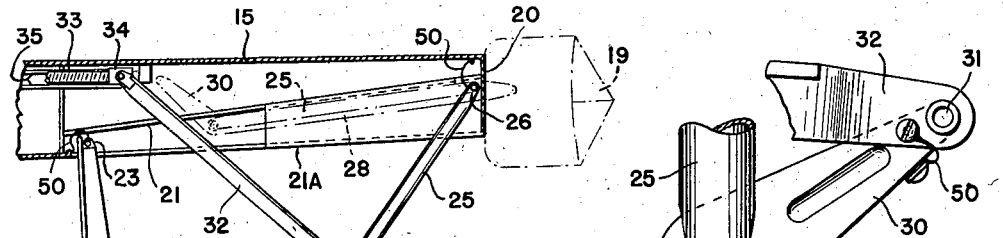
Fig. 3 shows a cross-section of the wing tip with the float and associated linkage in its extended position in full lines, and a front elevation of the retracted float in broken lines.
Fig. 8 is a detail of the joint at the apices of the V-struts showing the offset arm.

With particular reference to Figs. 2, 3, and 4, a retractable wing tip float 19 is pivotally attached to the wing 15 by a strut or brace 22 hinged to the wing at 23 and attached to the float at 24. Diagonal struts or braces 25F and 25R disposed in a V arrangement are pivotally attached to the wing at 26 adjacent to the wing end portion 20, and an inverted V-frame 28 comprising diagonal struts 28F and 28R are pivotally attached at their spaced ends 29 to the float 19 and at their common apex by the hinge or pivot pin 27. An offset or bell crank portion 30 of the V-frame 28 at its apex extends angularly to the plane of the braces and is provided with a pivotal connection 31. An actuating link 32, provided with bifurcated terminals, is pivotally attached at one end within the wing to a screw nut or trunnion 34, internally-threaded to engage the screw 33, and at its out-board end to the pivot 31 of the bell crank. The member 32 is preferably of channel cross-section, or has spaced sides in order that it may clear the screw rod, outboard bearing and other parts in the retracted position.

The outer edge of the wing terminates preferably in a vertical plane-faced end sheet 20 coextensive with a complementary surface on the upper side of the float 19. Cut out portions 20C are provided in the end sheet to permit the struts of the V-frame to pass there-through during its retraction. The lower surface of the wing adjacent to the end portion 20 is cut away to provide an opening indicated by the outline 21, a triangular shaped portion 21A of the lower wing surface remaining adjacent to the end sheet 20, its outline being determined by the triangular space embraced by the legs of the V-frame 28. The brace 22, carries a sheet 22S which is a movable part of the lower wing surface, and in the retracted position of the float is complementary to the above mentioned triangular shaped portion, and together with the nested V-frames, form a continuous wing undersurface substantially free of any protuberance which might cause aerodynamic drag.

The screw rod 33 is formed on a hollow shaft into which sleeves 36 and 37 are fitted and attached by means of the rivets 38 and the pin 39 respectively. The out-board end of the sleeve 36 has a portion of reduced diameter which is journaled in a bearing 40 attached to the wing frame. The opposite end of the screw assembly has a squared portion of the sleeve 37 which is fitted into a complementary socket in gearing which is housed within the gear box 42. Rotation is transmitted from the gear box 42 to similar gearing in the gear box 44 by means of the chordwise shaft 43 and then to the usual motive or hand power source of rotation disposed convenient to the pilot or crew within the hull, transmitted through the shaft 45.

The inner bifurcated end of the link 32 has bearing portions provided with bushings 46 which engage the transverse trunnion pins 47 of the trunnion 34. These pins are locked to the trunnion by the cotter 48 and are provided at their outer ends with anti-friction rollers 49 adapted to roll along the channel guideways of the tracks 35.

In order to properly ground the aircraft while upon the water, the joints between the movable portions of the retracting mechanism are bonded electrically by suitable bonding strips 50 as indicated at the upright brace pivots 23 and 24 and at the pivots 26, 27, 29 and 31. Accumulations of static or electricity which may form in the wing and in other parts of the aircraft structure are thereby guided to the floats as the aircraft is landed upon the surface of the water and these stray currents become grounded to the water thereby preventing charges of appreciable potential from forming within the various parts of the aircraft structure and minimizing fire hazard and interference with radio operation which is usually caused by the intermittent leakage of these currents across gaps of greater resistance. By providing suitable bonding and grounding means at the extremities of the wings these currents are led away from the fuselage and the center wing portion where the fuel, radio and other equipment is usually carried.

During flight, the float 19 is normally held retracted in the position shown in Fig. 2 and in the broken lines in Fig. 3, wherein it is drawn snugly against the end surface 20 of the wing with the bow and stern ends of the float continuous with the leading and training edges of the wing and aileron respectively, and the sides of the float projecting above and below the upper and lower surfaces of the wing 15. Suitable rubber cushioning pads are provided on the end sheet 20 to absorb shock and vibration between the wing and float and a latch, operable from the cabin, is provided to lock the float in its retracted position. During flight, air pressures are maintained below the wing and leakage prevented from the lower area of high pressure around the wing end to the zone of partial vacuum above the wing, thereby aiding in maintaining lift over the end portions of the wings. The plate 22S, when the float is extended, also serves as a wing tip shield in addition to longitudinally bracing the float support.

In the retracted position of the float the trunnion 34 is carried by the screw rod 33 to its extreme inward position where the squared face of the trunnion bears against the inner screw stop 51, the link 32 assuming an almost horizontal position, while the outer end of the link 32 maintains the necessary holding pull upon the bell crank portion 30 of the V-frame 28. The lower V-frame 28, pivoted to the float, and the upper V-struts 25, pivoted to the wing, provide a bracket having a pivot at 27 forming the center of the bell crank motion which is most effective in the retracted attitude of the float as indicated by the broken lines of Fig. 3. Rotation of the shafts 45 and 43 through the gearing 44 and 42 causes rotation of the screw 33 and translation of the trunnion 34 toward its out-board terminal. The outward thrust of link 32 against the bell crank 30 causes clockwise rotation of the V-frame 28 and its integral bell crank about the pivot 27 and simultaneous counterclockwise rotation of the latter and the associated link 25 about its fixed pivot 26. As the upper and lower V-frames 25 and 28 become aligned, they form a toggle together with the link 32, the upright brace 22 in the meantime having rotated clockwise to a nearly vertical attitude carrying the float 19 to its fully extended position. As the float reaches its fully lowered position, the V-frames 25 and 28 become aligned to form a pair of effective diagonal braces as viewed transversely, and at this point the clutch face 52 of the trunnion 34 engages the opposed teeth 53 of the clutch 54, thereby preventing further rotation of the screw 33 and preventing stripping of, or damage to the threads due to the tightening or wedging action occasionally resulting from overrunning of the trunnion against a plane faced stop due to the weight of the float and struts. The float and its bracing is then in a load-taking position, being braced both laterally and longitudinally, the sheet 22S of the upright brace frame serving also to brace this frame in a longitudinal direction. The sheet 22S additionally functions as a wing tip shield when the float is extended and at high angles of attack at lowered speeds in landing, it assists materially in maintaining lift.

The clutch stop 54 is held in position against a shoulder 55 on the sleeve 36 by means of the lock nut 56 and lock washer 57, engaging the threaded portion 58 of the sleeve as shown in Fig. 7. The body of the sleeve 36 between the shoulder 55 and the lock nut 56, is provided with a squared portion 59 engaging a similar squared opening in the clutch 54, preventing rotation of the latter. This arrangement permits adjustment of the clutch teeth 53 during assembly such that the rotation of the screw shaft is arrested at the proper limit of travel. Similar adjustment is provided at the assembly 60 fitted upon the inboard sleeve 37 adjacent to the bevelled gear transmission set 32. The gear is locked by stopping the trunnion just beyond dead center of pivot 27.

Figure 9:
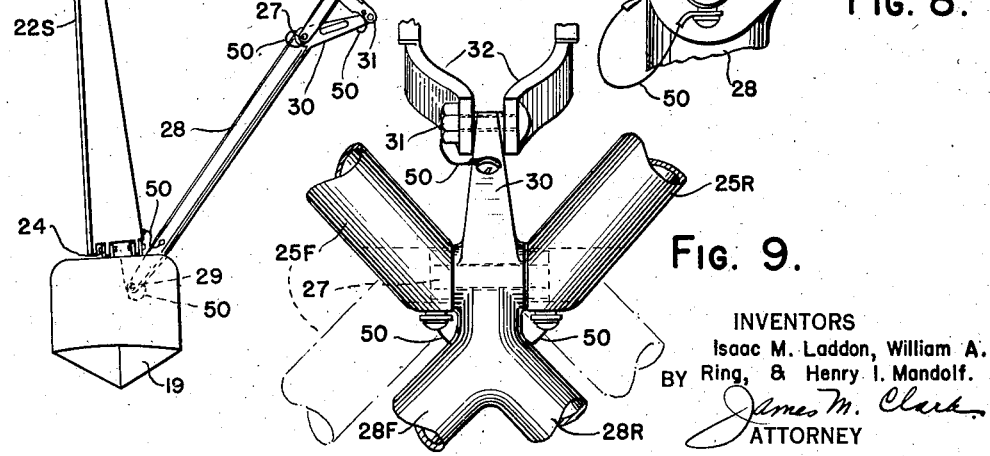
Fig. 9 is a side view of the joint shown in Fig. 8.

Counter-clockwise rotation of the screw 33, as viewed from the wing tip, causes disengagement of the clutch teeth 52 and 53 between the trunnion 34 and the clutch 54, respectively, and breaking of the toggle formed by the aligned V-shaped frames 25 and 28 by inward pulling of the link 32 upon the bell crank 30. Continued rotation of the screw causes the upper and lower V-frames 25 and 28 to rotate toward each other about their common pivot 27, at the apices of the two V's, and due to the small offset between the apices of the two frames and their pivot 27 as shown in Fig. 9, the lower frame 28 is nested within the upper frame 25 such that they are folded one within the other and lie in substantially the same plane when the float is fully retracted. In order to derive the greatest mechanical advantage from the bell crank linkage and thereby require a minimum holding force to be exerted to maintain the float in retracted position during flight, the V-frames are so proportioned that as they fold within the airfoil 15 their common apex, and the bell crank are at the highest contour point considering the camber of the wing upper surface, thereby permitting a relatively large eccentric arm extension and improving the ratio of the two effective arms of the bell crank.

In the extended position of the float 19 the frontal area of the upright wedge-shaped brace 22 exposed to the relative airflow, together with the pocket or recess 21 in the lower wing surface, serve to provide additional drag and an effective aerodynamic brake at low speeds and high angles of attack as the aircraft comes down to a landing. Under these flying conditions the shield 22S also prevents spilling of air around the wing tip as stated above.

While the drawings and description disclose a retractable wing tip float for a flying boat, the retracting mechanism shown is equally well adapted to the retraction of wheels and other ground engaging devices. In instances where the retracting mechanism is applied to retractable landing wheels adapted to support the entire weight of the aircraft upon the ground, the landing gear is placed closer to the fuselage and further from the wing tips. Additional recesses in the lower surface of the wing beyond the pivot 26, but inwardly of the wing extremity, are provided for housing the ground engaging member in such modifications.

Other modifications which will become apparent to one versed in the art are intended to be embraced within the scope of the appended claims.

What we claim is:

1. In a retractable stabilizing float for aircraft, a wing having a recess in the lower surface thereof, a substantially upright strut pivotally supporting said float in its extended position with respect to the said wing, an inclined strut assembly comprising an inverted V-frame pivotally attached to the float and V-struts pivotally attached to the wing, the said V-frame and struts being pivotally connected adjacent their apices, the said V-frame having an offset portion extending beyond its apex to form a bell crank, and actuating means pivotally linked to said bell crank to retract said float against said wing and said struts within the said recess such that the said V-struts are caused to lie one within the other in substantially the same plane.

2. In a landing gear retracting mechanism, a wing, a member adapted to partially support an aircraft while at rest, a strut attached to the member and pivotally connected to the wing, a V-frame pivoted to the member, a second V-frame pivoted to the wing, the apices of the V-frames being pivotally connected to each other, one of the frames having a bell crank portion offset from the plane of the frame, a link pivotally attached at one end to the bell crank, and means capable of translatory motion pivoted to an opposed end of the link whereby the said V-frames are moved from a nested position, wherein they lie in the same direction in substantially the same plane, to an extended position wherein they lie in opposite directions in a second plane and whereby the said member is extended from, and retracted to the wing.

3. In retracting mechanism for aircraft, a wing, a member adapted to partially support an aircraft at rest, a strut attached to the member and pivoted to the wing, a folding strut comprising a pair of V-frames intermediately pivoted at their apices and to the wing and the member at their opposed ends, the said struts and pivot axes lying in planes extending chordwise of the wing, a bell crank forming an offset portion of one of the V-frames and extending transversely to the aircraft, an actuating transversely disposed link pivotally associated with the bell crank and adapted to retract the said member by folding the V-frames about their intermediate pivot to a position wherein they lie in the same direction in substantially the same plane within the wing with the bell crank disposed at that point, along the chord of the wing, having the greatest camber.

4. In aircraft, a body forming a part thereof, a member adapted to partially support the aircraft when at rest, a strut attached to the member and pivoted to the body, a second foldable strut comprising a pair of V-frames pivotally attached to the body and to the member at their respective opposite ends, a bellcrank forming an offset portion of one of the V-frames, a transversely disposed link pivotally associated with the bellcrank and adapted to retract the said member by folding the V-frames about their intermediate pivot to a position wherein they lie in the same direction in substantially the same plane within the body.

5. In an aircraft, an airfoil provided with a recess therein, a retractable float adapted to partially support the aircraft when at rest, a plate member supporting the float and pivoted to the airfoil, a foldable strut comprising a pair of V-frames pivotally joined at their axes and pivotally attached to the airfoil and to the float at their respective opposite ends, a bellcrank forming an offset portion of one of the V-frames, a transversely disposed link pivotally associated with the bellcrank, means to move said link to cause retraction of said float to a position at the extremity of the airfoil, stop members to position said float so that it overhangs both upper and lower surfaces of said airfoil, the said means causing folding of the V-frames about their intermediate pivot to a position wherein they lie in the same direction in substantially the same plane within the airfoil, the said plate member fitting flush in said opening to form a continuation of the airfoil surface, and electrical bonding between the parts of all of said pivot joints.

6. In retracting mechanism for aircraft landing gear, an alighting member adapted to partially support the aircraft while at rest, struts pivotally attaching the member to the aircraft, a rotatable screw rod journalled at its opposed ends within said aircraft, a trunnion having internal threads engaging the screw rod, an actuating member pivotally connected to one of the said struts and to the said trunnion such that rotation of the screw rod causes rectilinear movement of the trunnion and retraction or extension of the said member, guide means fixed to the aircraft disposed parallel to the axis of the said screw rod and roller elements associated with said trunnion adapted to engage the said guide means, whereby stresses transmitted to said actuating member are carried by said trunnion roller elements to said guide means and bending of said screw shaft is avoided.

7. In aircraft, a wing, a member adapted to partially support the aircraft when at rest, a strut attached to the member and pivoted to the said wing, a second foldable strut comprising a pair of V-frames intermediately pivoted to each other and pivotally attached to the wing and to the member at their respective opposite ends, a bellcrank portion associated with one of the said V-frames, a link pivotally associated with the said bellcrank and adapted to retract the said member by folding the V-frames about their intermediate pivot to a position wherein they lie in the same direction in substantially the same plane, with the bellcrank disposed entirely within the wing in the region of the maximum camber of its profile prevailing at that section.

8. In combination in an aircraft, a retractable alighting device, a rotatable screw rod journalled at opposed ends within said aircraft, a trunnion member axially threaded for engagement with said screw rod, roller elements associated with the trunnion and disposed on opposed sides of the said axially threaded portion and rotatable on an axis transverse thereto, an actuating strut pivotally associated with the said trunnion about its transverse axis, and guide means fixed to the said aircraft on opposed sides of and parallel to the said screw shaft adapted for engagement by the said roller elements, whereby rotation of the screw shaft results in translatory movement of said trunnion and retraction of the said alighting device.

ISAAC M. LADDON.
WILLIAM A. RING.
HENRY I. MANDOLF.